(12) United States Patent
Durhman et al.

(10) Patent No.: US 8,751,813 B2
(45) Date of Patent: *Jun. 10, 2014

(54) CROSS VALIDATION OF DATA USING MULTIPLE SUBSYSTEMS

(75) Inventors: David Durhman, Beaverton, OR (US); Travis Schluessler, Hillsboro, OR (US); Raj Yavatkar, Portland, OR (US); Vincent Zimmer, Federal Way, WA (US); Carey Smith, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/550,583

(22) Filed: Jul. 16, 2012

(65) Prior Publication Data

US 2012/0284525 A1 Nov. 8, 2012

Related U.S. Application Data

(63) Continuation of application No. 12/502,868, filed on Jul. 14, 2009, now Pat. No. 8,225,101, which is a continuation of application No. 10/865,144, filed on Jun. 9, 2004, now Pat. No. 7,594,124.

(51) Int. Cl.
*H04L 9/32* (2006.01)

(52) U.S. Cl.
USPC .......................................... 713/181; 713/168

(58) Field of Classification Search
USPC .............. 713/193, 168, 181; 711/173; 726/22
See application file for complete search history.

(56) References Cited

U.S. PATENT DOCUMENTS

| | | | |
|---|---|---|---|
| 5,280,627 A | 1/1994 | Flaherty et al. | |
| 5,675,800 A | 10/1997 | Fisher et al. | |
| 5,732,268 A | 3/1998 | Bizzarri | |
| 5,844,986 A | 12/1998 | Davis | |
| 5,859,911 A * | 1/1999 | Angelo et al. | 713/187 |
| 5,953,502 A * | 9/1999 | Helbig, Sr. | 726/24 |
| 6,275,851 B1 | 8/2001 | Cromer et al. | |
| 6,539,473 B1 | 3/2003 | Hubacher et al. | |
| 6,625,729 B1 | 9/2003 | Angelo et al. | |
| 6,732,267 B1 | 5/2004 | Wu et al. | |
| 6,748,423 B1 | 6/2004 | Khanna et al. | |
| 7,225,245 B2 | 5/2007 | Gurumoorthy et al. | |
| 7,594,124 B2 | 9/2009 | Durham et al. | |
| 8,225,101 B2 | 7/2012 | Durham et al. | |

(Continued)

OTHER PUBLICATIONS

"3Com Embedded Firewall 1.5.1 Evaluated Configuration Guide", Secure Computing; Part No. 00-0937471-D; Version Date: Apr. 7, 2003; prepared by: Logica CLEF (LFL), Logica UK Ltd., Chaucer House, The Office Park, Springfield Drive, Leatherhead, Surrey KT22 7LP, 12 pages.

(Continued)

*Primary Examiner* — Samson Lemma
(74) *Attorney, Agent, or Firm* — Barnes & Thornburg LLP

(57) ABSTRACT

A method and apparatus for cross validation of data using multiple subsystems are described. According to one embodiment of the invention, a computer comprises a first subsystem and a second subsystem; and a memory, the memory comprising a first memory region and a second memory region, the first memory region being associated with the first subsystem and a second memory region being associated with the second subsystem; upon start up of the computer, the first subsystem to validate the second memory region and the second subsystem to validate the first memory region.

20 Claims, 6 Drawing Sheets

(56) References Cited

U.S. PATENT DOCUMENTS

2002/0166062 A1 11/2002 Helbig
2005/0203582 A1* 9/2005 Healy et al. .................. 607/31
2005/0278563 A1 12/2005 Durham et al.

OTHER PUBLICATIONS

Non-Final Office Action for U.S. Appl. No. 10/865,354, mailed Apr. 4, 2008.
Notice of Allowance for U.S. Appl. No. 10/865,354, mailed Oct. 1, 2008.
Notice of Allowance for U.S. Appl. No. 10/865,354, mailed Mar. 3, 2009.
Non-Final Office Action for U.S. Appl. No. 10/865,144, mailed Apr. 1, 2008.
Notice of Allowance for U.S. Appl. No. 10/865,144, mailed Sep. 19, 2008.
Notice of Allowance for U.S. Appl. No. 10/865,144, mailed Dec. 15, 2008.
Notice of Allowance for U.S. Appl. No. 10/865,144, mailed Apr. 1, 2009.

* cited by examiner

CROSS VALIDATION OF DATA USING MULTIPLE SUBSYSTEMS

CROSS-REFERENCE TO RELATED APPLICATIONS

The present application is a continuation application of, and claims priority to, U.S. application Ser. No. 12/502,868, entitled "CROSS VALIDATION OF DATA USING MULTIPLE SUBSYSTEMS," which was filed on Jul. 14, 2009 and which is a continuation application of U.S. application Ser. No. 10/865,144, filed on Jun. 9, 2004, now U.S. Pat. No. 7,594,124.

FIELD

An embodiment of the invention relates to computer security in general, and more specifically to cross validation of data using multiple subsystems.

BACKGROUND

In computer system operations, the danger of attacks from malicious elements such as viruses has been increasing. The potential cost to system operations can be extremely high if an attack results in halting important operations, destroying data, or releasing sensitive information. For this reason, implementation of sufficient security processes to counter attacks or minimize damage has become essential.

For example, a non-volatile memory may contain the BIOS (basic input-output system) or a subset of the BIOS for a computer system. In a conventional process, a trusted platform module (TPM) or other system may be utilized to validate the sanctity of software images stored in non-volatile memory by performing a single cryptographic hash on the non-volatile memory, thereby creating a core root of trust for measurement (CRTM) for the system.

However, with conventional approaches, an attacker who succeeds in compromising computer system resources may compromise the entire system. The compromised system may not detect or report a security breach. As a result, a computer system may appear to be secure, but while in fact being the victim of a security breach. If the computer system is connected to a network, the system may then potentially spread the security attack through the network.

BRIEF DESCRIPTION OF THE DRAWINGS

The invention may be best understood by referring to the following description and accompanying drawings that are used to illustrate embodiments of the invention. In the drawings.

DETAILED DESCRIPTION OF THE DRAWINGS

Figure 1:
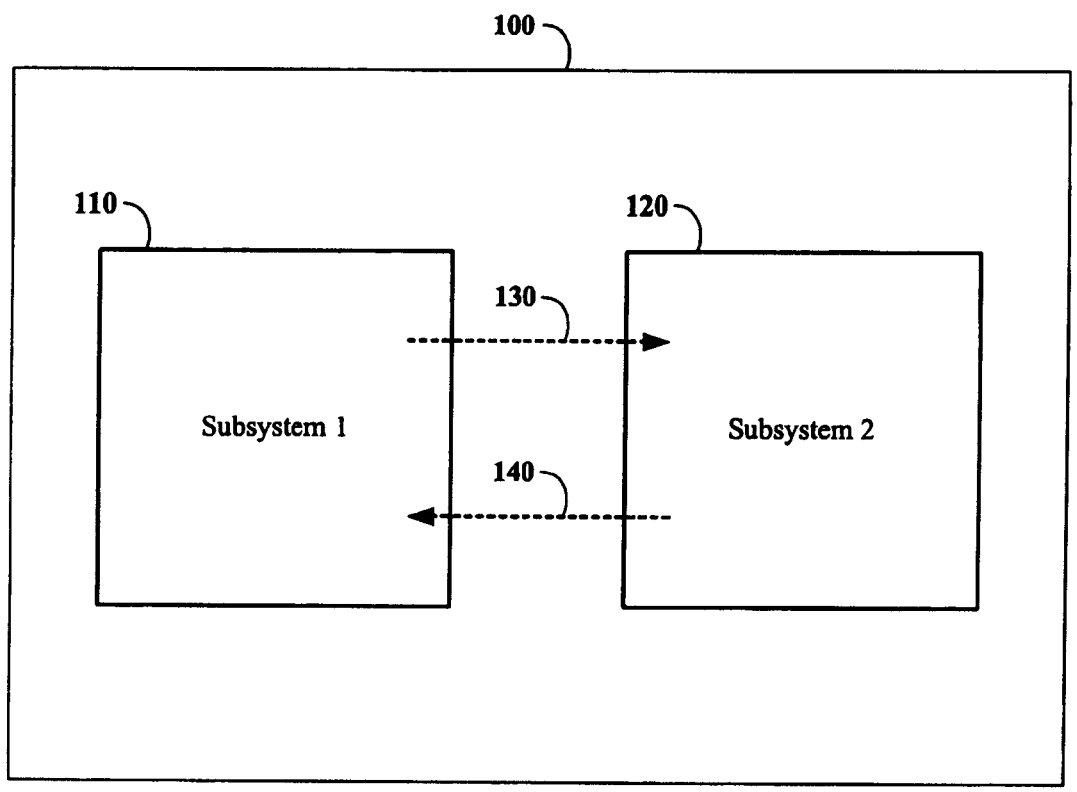
FIG. 1 illustrates an embodiment of a computer system having multiple subsystems, with each subsystem providing a security check on another subsystem.

A method and apparatus are described for cross validation of data using multiple subsystems.

Under an embodiment of the invention, a computer system uses multiple subsystems for verification of security in the start up of a system. Under one embodiment, each subsystem provides cross-validation of the security posture of another subsystem. For example, a first subsystem validates the security of the second subsystem and the second subsystem validates the security of the first subsystem. In an embodiment, each subsystem has authority to verify data for the other subsystem but does not possess authority to make changes to such data. For example, a first subsystem may have the ability to read and verify data of a second system, but the first subsystem does not have the ability to write such data. In this manner, if the security of a subsystem is violated, such violation may be detected by another subsystem unless both the first and the second subsystems are subject to compromise. Further, under an embodiment of the invention, the compromise of one subsystem does not automatically lead to the compromise of another subsystem.

In an embodiment of the invention, a computer system comprises two or more processors, with each processor having an associated memory. The associated memory for each processor may contain a software image for the processor. Each processor is able to read the associated memory for one or more of the other processors in the system and check the validity of the stored software image.

In a particular embodiment, a computer system comprises a first processor having an associated first non-volatile memory and a second processor having an associated second non-volatile memory. The first processor can read from and write to the first non-volatile memory, and can read from the second non-volatile memory. The second processor can read from and write to the second non-volatile memory, and can read from the first non-volatile memory. In starting the system, the first processor will read data contained in the second non-volatile memory and determine the validity of such data. Further, the second processor will read data contained in the first non-volatile memory and determine the validity of such data. If the data contained in the first non-volatile memory and the data contained in the second non-volatile memory is determined to be valid, then the system start up may proceed. If either data is determined to be invalid, there is a chance of a system security failure and the system is notified. Data validity may be determined by various methods, including any checksum or other error detection method. In one embodiment, a method comprises performing a cryptographic hash of stored data and comparing the results with expected results. Under an embodiment of the invention, the expected results for use in comparison are provided by a trusted agent and are stored in the memory associated with the verifying processor.

Under an embodiment of the invention, a memory may contain multiple memory regions, with each region receiving a separate verification. In one embodiment, a non-volatile memory may include a BIOS software image, which is relatively stable and thus requires changes in verification only when the BIOS of the computer system is changed, and dynamic data, such as configuration parameters, which may be changed more often and thus requires changes in verification. In a start-up process, a first processor may check software image data contained in the non-volatile memory of a second processor, and then check additional data sectors as required.

In one embodiment of the invention, a computer system, such as a PC (personal computer), contains a main processor with associated non-volatile memory for storage of a BIOS image for system start up. The system further includes an independent adjunct processor with its own associated non-volatile memory for storage of a software image for its startup. Under an embodiment, the non-volatile memory associated with each processor is read/write to the owning processor but read-only to the opposing processor. This allows, for example, a platform co-processor and a system BIOS to validate the integrity of each other's firmware store, thus addressing a major security issue for a PC in which the compromise of a BIOS or intelligent network device can potentially represent a single point of failure resulting in the compromise of an entire system.

In one example for a system containing a first processor and a second processor, each processor of the system performs the following operations in the system start up:

(1) The processor loads its own software image from a non-volatile memory associated with the processor;

(2) The processor reads the image region of the other processor's non-volatile memory store for verification, the processor expanding any compressed data as necessary;

(3) The processor performs a cryptographic hash operation on the software image contained in the non-volatile memory of the other processor;

(4) The processor compares the results of the cryptographic hash operation against an expected value for the operation, the expected value being stored in the processor's own non-volatile memory;

(5) The processor repeats operations (2) through (4) for each separate region of the non-volatile memory storage that needs to be verified. The repetition of such operations allows for separate verification of, for example, configuration parameters stored in one region of non-volatile memory and executable code images stored in another region of non-volatile memory. Configuration parameters and executable code images may have differing levels of compression and other distinguishing features, which may be addressed with separate verification processes.

(6) If every result does not match the expected value, the system is notified that the security of the non-volatile memory store has been compromised. The system may then take action to respond to the security breach, such as by halting start up, disconnecting from the network, isolating insecure areas, or other such actions. If each result for both processors matches the appropriate expected value, then the software boot images for both processors are known to be the correct images, i.e., have not been violated by an attacker, and the platform can proceed with system start up.

Under an embodiment of the invention, in order to successfully compromise a system, an attacker would be required to compromise the software images stored in multiple non-volatile memory regions for independent processors, thereby providing a more challenging configuration than a system containing a single point of failure. For example, an embodiment of the invention may be utilized to assist in protecting against BIOS overwrite attacks, and attacks which boot a system from a floppy in order to compromise the security of the network. An embodiment of the invention provides cross-verification in the start up of a system using multiple subsystems, and thus a non-compromised subsystem may be capable of detecting a security breach for a compromised subsystem.

FIG. 1 illustrates an embodiment of a computer system having multiple subsystems, with each subsystem providing a security check on another subsystem. In this example, a computer system 100 includes a first subsystem 110 and a second subsystem 120. Under an embodiment of the invention, upon startup of the system 100, the first subsystem 110 performs a security check 130 of the second subsystem 120. Further, the second subsystem 120 performs a security check 140 of the first subsystem 110. If the security of either subsystem is not verified, the startup of the computer system 100 may be halted or other action may be taken to prevent damage that may occur as a result of a security breach.

If the security of both subsystems is verified, then the computer system 100 may complete startup as normal. Under an embodiment of the invention, the first subsystem 110 may read data from the second subsystem 120 but is not authorized to alter such data. Under another embodiment, the second subsystem 120 may read data from the first subsystem 110 but is not authorized to alter such data. In other embodiments of the invention, there may be additional subsystems. The security for each such subsystem may be verified by one or more of the other subsystems. In one example, a system may include three subsystems. The security of each subsystem may be verified by both of the other subsystems, or each subsystem may be verified by one of the other subsystems. Under an embodiment of the invention, the system 100 may be connected to a network. The cross verification of the first subsystem 110 and the second subsystem 120 may act to prevent start up of a compromised system, thereby preventing connection to the network and the possible spread of the attack to other systems on the network.

Figure 2:
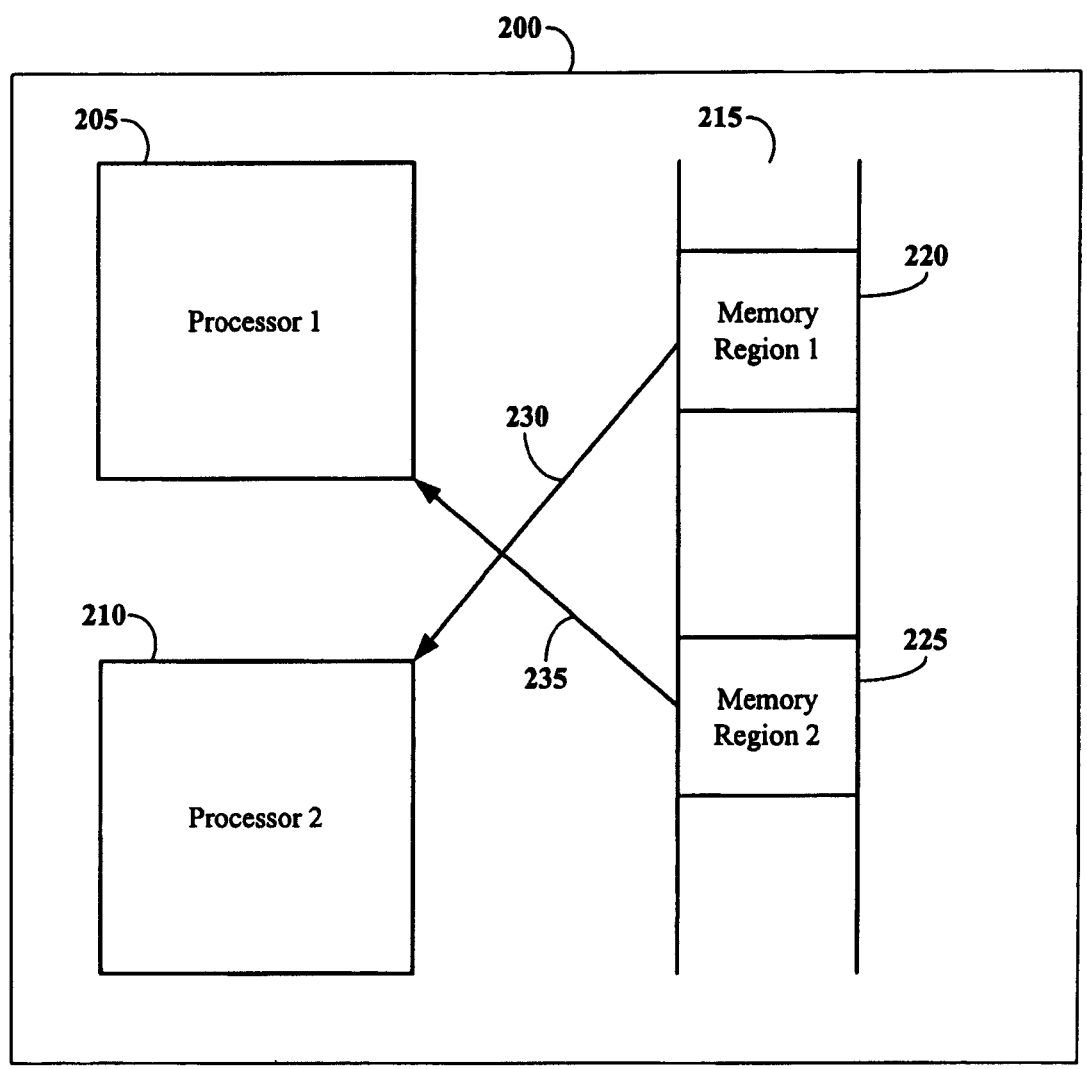
FIG. 2 illustrates an embodiment of a first processor and a second processor to provide cross checks of software images.

FIG. 2 illustrates an embodiment of a first processor and a second processor to provide cross checks of software images. In this illustration, a system includes a first processor 205 and a second processor 210. The system 200 further includes memory 215. The memory may be non-volatile memory, such as flash memory, that will hold data without application of power. The memory 215 includes at least a first memory region 220 and a second memory region 225. The structure of the memory may vary with the embodiment. Under one embodiment of the invention, the first memory region 220 and the second memory region 225 are separate sectors of a memory. Under another embodiment, the first memory region 220 and the second memory region 225 may be physically separate memories.

The first memory region 215 may include a software image for the first processor 205, and the second memory region 210 may include a software image for the second processor 225. In startup of the system 200 the first processor 205 obtains data stored in the second memory region 225 and verifies the data 230. In addition, the second processor 210 obtains data stored in the first memory region 220 and verifies the data 235. Under an embodiment of the invention, the verification of data is accomplished by processing the data and comparing the result of the processing with an expected result.

Figure 3:
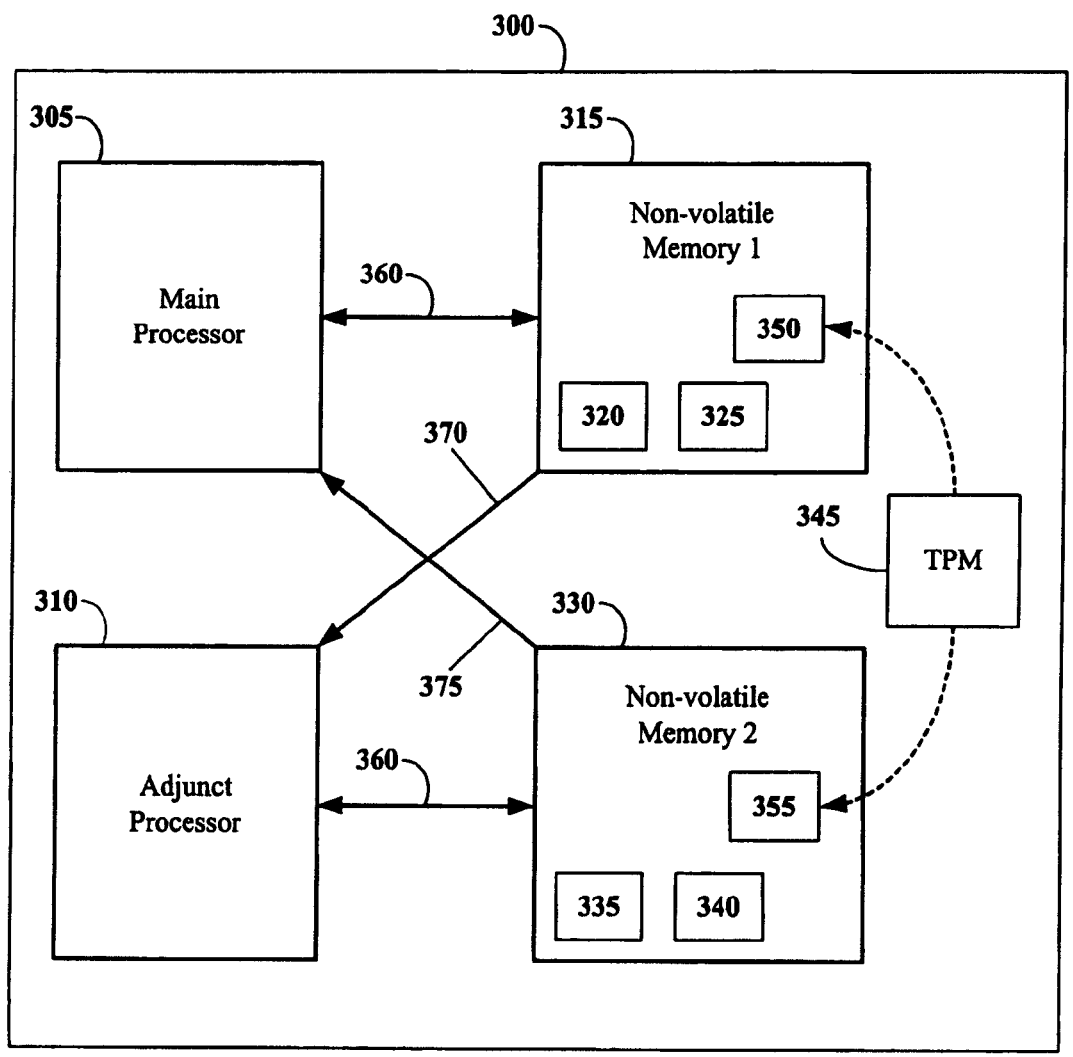
FIG. 3 illustrates a embodiment of a system utilizing a main processor and an adjunct processor to evaluate the contents of each other's non-volatile memory.

FIG. 3 illustrates an embodiment of a system utilizing a main processor and an adjunct processor to evaluate the contents of each other's non-volatile memory. In this illustration, a computer system 300 includes a main processor 305 and an adjunct processor 310. Other embodiments of the invention may include additional processors. The processors may be separate physical processors or may be logical processors contained in a physical processor. Each processor has an associated non-volatile memory, a first non-volatile memory 315 being associated with the main processor 305 and a second non-volatile memory 330 being associated with the adjunct processor 310.

Each non-volatile memory may include multiple regions. In this example, the first non-volatile memory 315 includes a first region 320 for storage of a software image for the main processor 305 and a second region 325 for storage of configuration parameters for the main processor 305. The second non-volatile memory 330 includes a first region 335 for storage of a software image for the adjunct processor 310 and a second region 340 for storage of configuration parameters for the adjunct processor 310.

The computer system also may include access to a trusted entity, such as a TPM (trusted platform module) 345. The TPM 345 provides the main processor 305 with one or more expected values to verify the data stored in the second non-volatile memory 315, with the one or more expected values being stored in the first non-volatile memory, such as in a region 350. The TPM 345 may further provide the adjunct processor 310 with one or more expected values to verify the data stored in the first non-volatile memory 330, with the one or more expected values being stored in the second non-volatile memory, such as in a region 355. In this illustration, the main processor 305 has read and write authority 360 for the associated first non-volatile memory 315, and has read-only authority 375 for the second non-volatile memory 330. The adjunct processor 310 has read and write authority 365 for the associated second non-volatile memory 330, and has read-only authority 370 for the second non-volatile memory 330.

In the start up of the system, the main processor 305 loads the software image 320 from the first non-volatile memory 315 and the adjunct processor loads the software image 335 from the second non-volatile memory 330. The main processor 305 reads the software image 335 from the second non-volatile memory 330, performs a verification operation, and compares the result of the verification operation with an expected result in the one or more expected values 350 stored in the first non-volatile memory 315. The adjunct processor reads the software image 320 from the first non-volatile memory 315, performs a verification operation and compares the result of the verification operation with an expected result in the one or more expected values 355 stored in the second non-volatile memory 330. The main processor 305 may further perform a verification of the configuration parameters 335 stored in the second non-volatile memory 330, and the adjunct processor 310 may perform a verification of the configuration parameters 320 stored in the first non-volatile memory 315.

Figure 4:
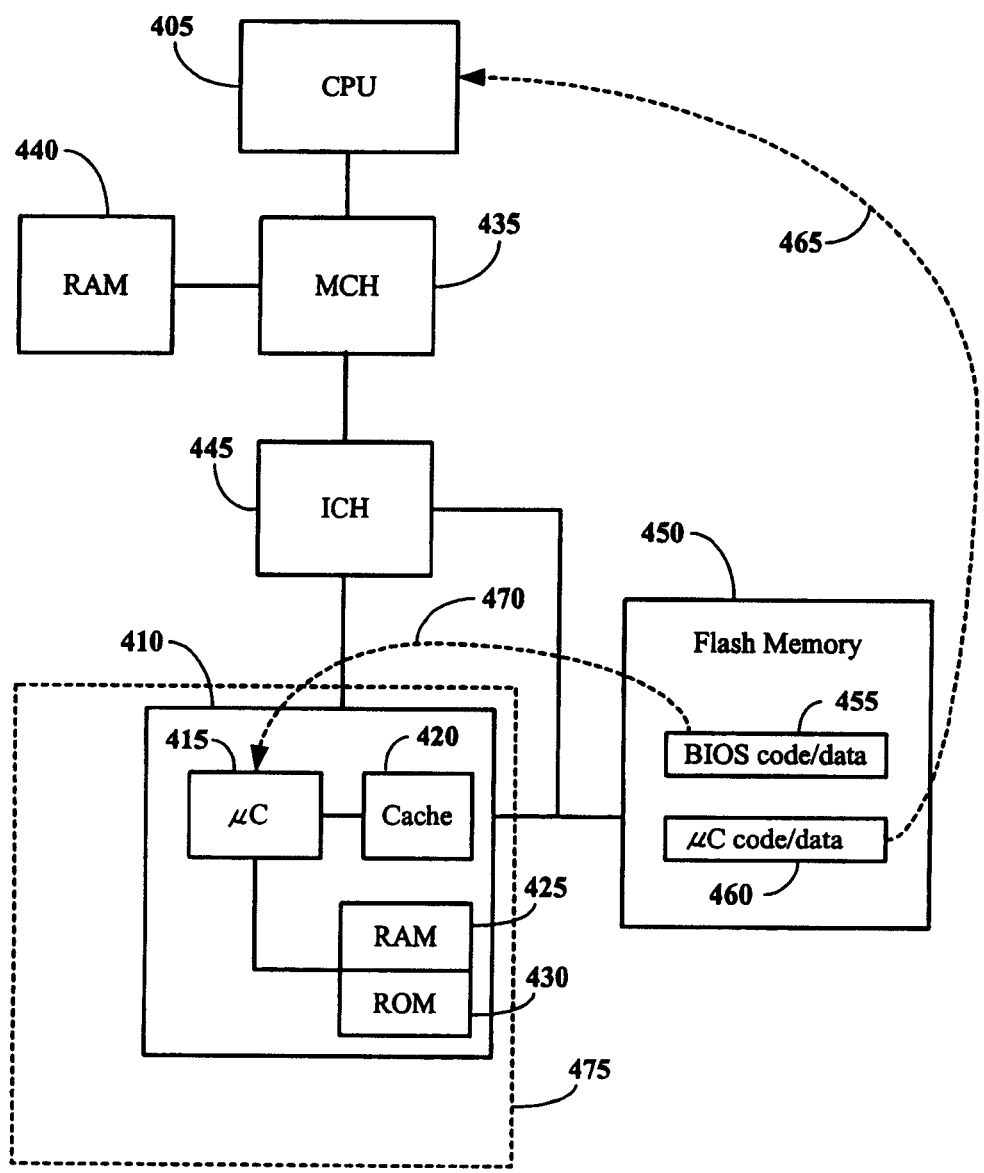
FIG. 4 illustrates an embodiment of a system providing verification of data for a main processor and an adjunct processor.

FIG. 4 illustrates an embodiment of a system providing verification of data for a main processor and an adjunct processor. In this illustration, a system includes a main processor, indicated as the central processing unit (CPU) 405, and an adjunct processor 410. In this particular illustration, the adjunct processor 410 includes a microcontroller 415, a cache memory 420, random access memory (RAM) 425, and read-only memory (ROM) 430. Under an embodiment of the invention, the adjunct processor 410 is included in an intelligent network device 475. In another embodiment of the invention, the adjunct processor 410 is included in a memory controller hub (MCH) 435.

The CPU 405 is coupled with the memory controller hub (MCH) 435 (which may be referred to as the north bridge). The MCH 435 is coupled with RAM 440 and to an input/output control hub (ICH) 445 (which may be referred to as the south bridge). In this illustration, the ICH 445 is coupled with the adjunct processor 410 and to non-volatile memory storage 450. In an embodiment of the invention, the adjunct processor 410 and the non-volatile memory 450 are also coupled with each other. The non-volatile memory storage 450 includes a region containing BIOS code and data 455 and a region containing microcontroller code and data 460. Under an embodiment of the invention, the BIOS code and data 455 is read and write accessible to the CPU 405 and is read-only accessible to the adjunct processor 410. Further, the microcontroller code and data 460 is read and write accessible to the adjunct processor 410, and is read-only accessible to the CPU 405.

In the initialization of the system, the BIOS code and data 455 is loaded into the CPU 405 and the microcontroller code and data 460 is loaded into the adjunct processor 410. In addition, the CPU 405 reads the microcontroller code and data 460 and verifies the validity of such information, while the adjunct processor reads the BIOS code and data 455 and verifies the validity of such information. The method utilized in verification of validity varies with the embodiment and includes any method by which a change in the data structure may be detected, including any checksum or other error checking mechanism. Under an embodiment of the invention, the BIOS on the CPU 405 computes a cryptographic hash of the microcontroller code and data, and firmware on the microcontroller 415 computes a cryptographic hash of the BIOS code and data. If both cryptographic hash results match expected values, the system start up is allowed to continue. If either result does not match the expected value, the system is notified that the system data is comprised, thereby allowing a halt to the system start up.

In this manner, if the BIOS 455 is compromised, the adjunct processor 410 is capable of detecting the problem. Because the CPU 405 has read-only authority for the microcontroller code and data 460, a comprised CPU 405 does not have the ability to attack cross verification by the adjunct processor 410. Similarly, if the microcontroller code and data 460 is compromised, the CPU 405 is capable of detecting the problem. Because the adjunct processor 410 has read-only authority for the BIOS code and data 455, a comprised adjunct processor 410 does not have the ability to attack cross verification by the CPU 405. For this reason, independent compromise of both systems is required to bypass the security verification. In embodiments of the invention utilizing more than two processors, more cross verification may be provided, thus requiring that more subsystems be comprised in order to compromise a computer system.

Figure 5:
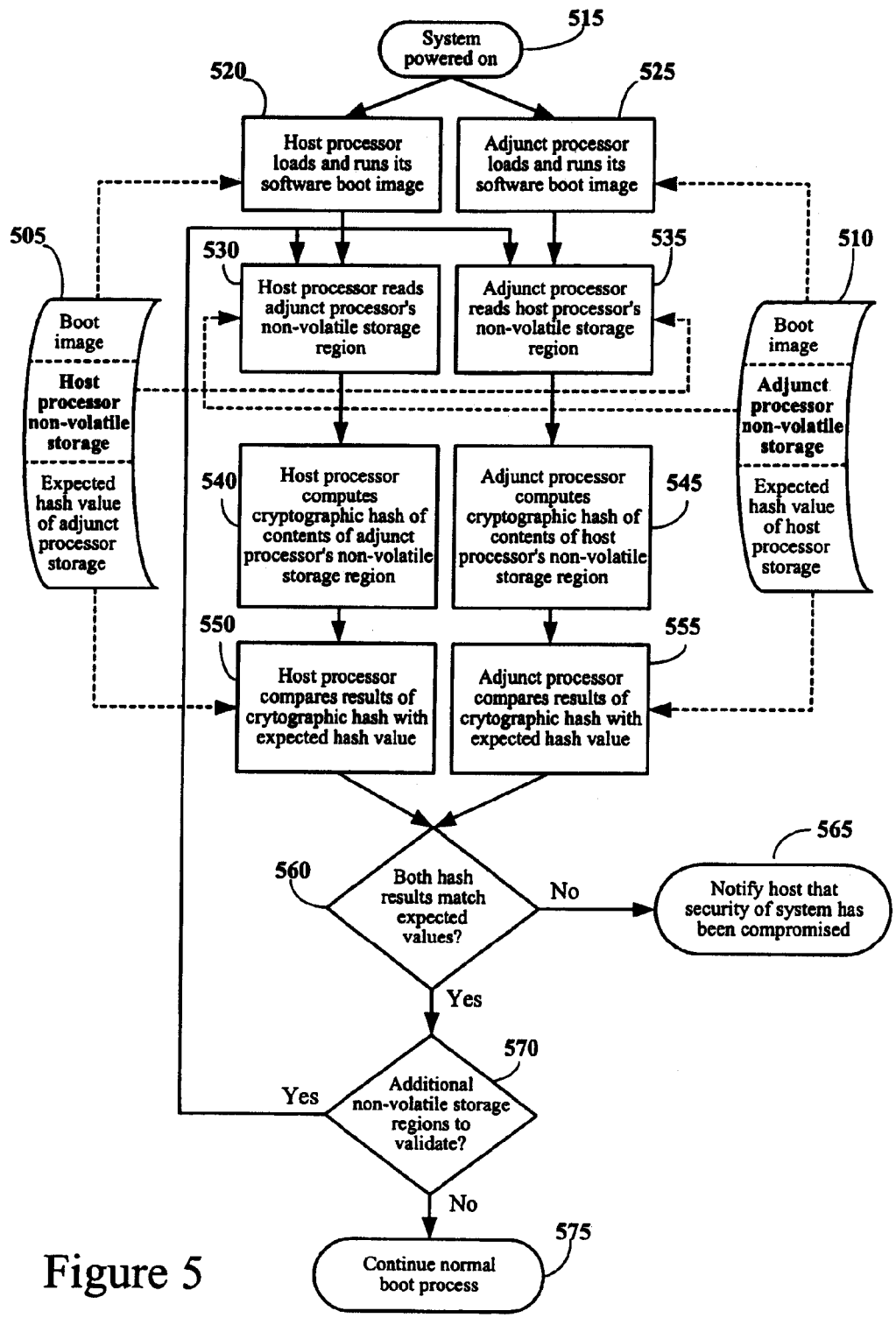
FIG. 5 is a flow chart illustrating an embodiment of cross verification in the boot up of a computer system.

FIG. 5 is a flow chart illustrating an embodiment of cross verification in the boot up of a computer system. In this illustration, a system includes a host processor non-volatile storage 505 to contain data relating to a host processor and an adjunct processor non-volatile storage 510 to hold data relating to an adjunct processor. The system is powered on 515, thereby starting initialization processes. In this illustration, processes for the host processor and for the adjunct processor are shown side by side. Such processes may be performed simultaneously in whole or in part. The host processor loads and runs a software boot image 520 from the host processor non-volatile storage 505, and the adjunct processor loads and runs a software boot image 525 from the adjunct processor non-volatile storage 510.

In order to verify security, the host processor reads a region of the adjunct processor's non-volatile storage 530 and the adjunct processor reads a region of the host processor's non-volatile storage 535. The verification process utilized by the host processor and the adjunct processor may vary by embodiment. In one embodiment, the host processor computes a cryptographic hash of the contents of the region of the adjunct processor's non-volatile storage 540 and the adjunct processor computes a cryptographic hash of the contents of the region of the host processor's non-volatile storage 545. An expected hash value of the adjunct processor storage region is stored in the host processor non-volatile storage 505 and an expected hash value of the host processor storage region is stored in the adjunct processor non-volatile storage 510. Such expected values are received from a trusted source, such as a trusted platform module or a remote IT administrator.

The host processor compares the results of its cryptographic hash of the adjunct processor storage with the expected value 550, while the adjunct processor compares the results of its cryptographic hash of the host processor storage with the expected value 555. If either hash result does not match the expected value 560, then the host is notified that the security of the system has been compromised. If both hash results match the expected results 560, then there is a determination whether there are any other regions of the non-volatile storage to be validated 570. If there are additional regions to be validated, then the process returns, as appropriate, to the host processor reading a region of the adjunct processor's non-volatile storage 530 and the adjunct processor reading a region of the host processor's non-volatile storage 535. If there are no other regions to be validated 570, then the system continues with the normal boot process 575.

Figure 6:
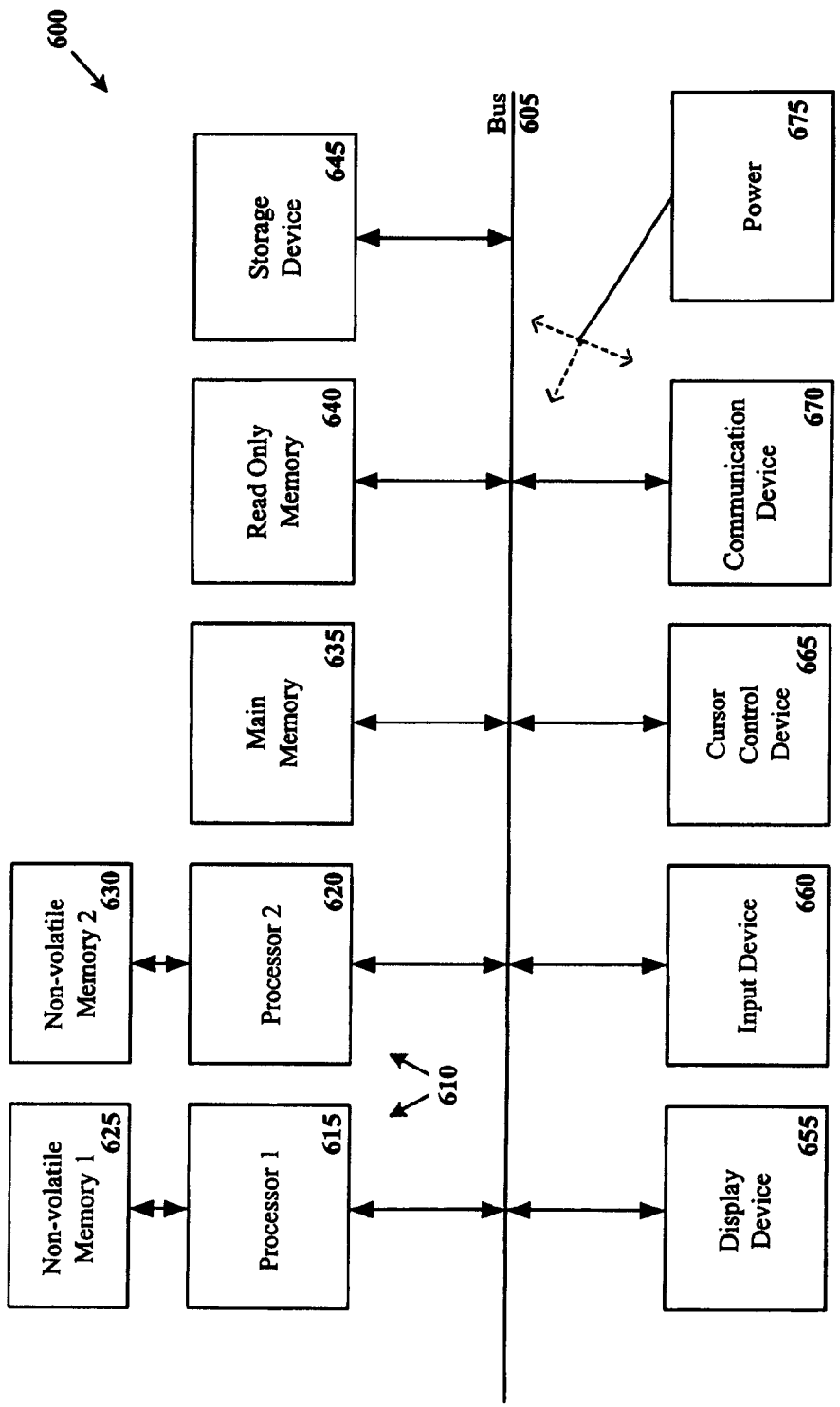
FIG. 6 is block diagram of an embodiment of a computer system to provide security verification utilizing multiple processors.

FIG. 6 is block diagram of an embodiment of a computer system to provide security verification utilizing multiple processors. Under an embodiment of the invention, a computer 600 comprises a bus 605 or other communication means for communicating information, and a processing means such as two or more processors 610 (shown as a first processor 615 and a second processor 620) coupled with the first bus 605 for processing information. The processors may comprise one or more physical processors and one or more logical processors. Under an embodiment of the invention, the computer 600 may include non-volatile memory, such as a flash memory, which is shown as a first non-volatile memory 625 that is associated with the first processor 615 and a second non-volatile memory 630 that is associated with the second processor 630. Under an embodiment of the invention, the first non-volatile memory 625 may hold a software image for the first processor 615 and the second non-volatile memory 630 may hold a software image for the second processor 620. Under an embodiment of the invention, the first processor 615 may have read and write access to the first non-volatile memory 625 and read-only access to the second non-volatile memory 630, while the second processor 620 may have read and write access to the second non-volatile memory 630 and read-only access to the first non-volatile memory 625.

The computer 600 further comprises a random access memory (RAM) or other dynamic storage device as a main memory 635 for storing information and instructions to be executed by the processors 610. Main memory 635 also may be used for storing temporary variables or other intermediate information during execution of instructions by the processors 610. The computer 600 also may comprise a read only memory (ROM) 640 and/or other static storage device for storing static information and instructions for the processor 610.

A data storage device 645 may also be coupled to the bus 605 of the computer 600 for storing information and instructions. The data storage device 645 may include a magnetic disk or optical disc and its corresponding drive, flash memory or other nonvolatile memory, or other memory device. Such elements may be combined together or may be separate components, and utilize parts of other elements of the computer 600.

The computer 600 may also be coupled via the bus 605 to a display device 655, such as a cathode ray tube (CRT) display, a liquid crystal display (LCD), or other display technology, for displaying information to an end user. In some environments, the display device may be a touch-screen that is also utilized as at least a part of an input device. In some environments, display device 655 may be or may include an auditory device, such as a speaker for providing auditory information. An input device 660 may be coupled to the bus 605 for communicating information and/or command selections to the processors 610. In various implementations, input device 660 may be a keyboard, a keypad, a touch-screen and stylus, a voice-activated system, or other input device, or combinations of such devices. Another type of user input device that may be included is a cursor control device 665, such as a mouse, a trackball, or cursor direction keys for communicating direction information and command selections to the one or more processors 610 and for controlling cursor movement on the display device 665.

A communication device 670 may also be coupled to the bus 605. Depending upon the particular implementation, the communication device 670 may include a transceiver, a wireless modem, a network interface card, or other interface device. The computer 600 may be linked to a network or to other devices using the communication device 670, which may include links to the Internet, a local area network, or another environment. The computer 600 may also comprise a power device or system 675, which may comprise a power supply, a battery, a solar cell, a fuel cell, or other system or device for providing or generating power. The power provided by the power device or system 675 may be distributed as required to elements of the computer 600.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

The invention claimed is:

1. A system comprising:
    a first processor and a second processor;
    a first memory and a second memory; and
    a trusted platform module to generate a first expected result and a second expected result for verification of contents of the first and second memory;
    wherein the first processor to verify the contents of the second memory as a function of the first expected value generated by the trusted platform module and the second processor to verify the contents of the first memory as a function of the second expected value generated by the trusted platform module.

2. The system of claim 1, wherein the first processor has read and write access to the first memory and has read-only access to the second memory and the second processor having read and write access to the second memory and having read-only access to the first memory.

3. The system of claim 1, wherein the first memory is a first non-volatile memory and the second memory comprises a second non-volatile memory.

4. The system of claim 3, wherein the first non-volatile memory contains a software image for the first processor and the second non-volatile memory contains a software image for the second processor.

5. The system of claim 1, wherein:
    the first processor is to verify the contents of the second memory by performing a first cryptographic hash on the contents of the second memory and comparing the result of the first cryptographic hash to the first expected value, and
    the second processor is to verify the contents of the first memory by performing a second cryptographic hash on the contents of the first memory and comparing the result of the second cryptographic hash to the second expected value.

6. The system of claim 1, wherein the first expected value is stored in a first region of the first memory and the second expected value is stored in a first region of the second memory,
    wherein the first processor is to retrieve the first expected value from the first region of the first memory to verify the contents of a second region of the second memory, and
    wherein the second processor is to retrieve the second expected value from the first region of the second memory to verify the contents of a second region of the second memory.

7. The system of claim 6, wherein the second region of the first memory includes a first software image for the first processor and the second region of the second memory includes a second software image for the second processor.

8. The system of claim 7, wherein the first memory comprises a third region having stored therein configuration parameters for the first processor and the second memory comprises a third region having stored therein configuration parameters for the second processor,
    wherein the first processor to verify the configuration parameters stored in the third region of the second memory, and
    wherein the second processor to verify the configuration parameters stored in the third region of the first memory.

9. The system of claim 1, wherein:
    the first processor is to further perform a first checksum operation on the contents of the second memory and compare the result of the first checksum operation with a first expected checksum result, and
    the second processor is to further perform a second checksum operation on the contents of the first memory and compare the result of the second checksum operation with a second expected checksum result.

10. A method comprising:
    generating, using a trusted platform module of a computing system, a first expected result and a second expected result for verification of a first memory and a second memory of the computing system;
    verifying, using a first processor of the computing system, contents of a first region of the second memory having stored therein a software image for the second processor as a function of the first expected result; and
    verifying, using the second processor of the computing system, contents of a first region of the first memory having stored therein a software image for the first processor as a function of the second expected result.

11. The method of claim 10, further comprising:
    storing the first expected result in a second region of the first memory; and
    storing the second expected result in a second region of the second memory,
    wherein verifying the contents of the first region of the second memory comprises retrieving, with the first processor, the first expected result from the second region of the first memory,
    wherein verifying the contents of the first region of the first memory comprises retrieving, with the second processor, the second expected result from the second region of the second memory.

12. The method of claim 11, further comprising:
    verifying, using the first processor, configuration parameters for the second processor stored in a third region of the second memory; and
    verifying, using the second processor, configuration parameters for the first processor stored in a third memory region of the first memory.

13. The method of claim 10, wherein the first processor has read and write access to the first memory and has read-only access to the second memory and the second processor having read and write access to the second memory and having read-only access to the first memory.

14. The method of claim 10, wherein:
  verifying the contents of the first region of the second memory comprises performing a first cryptographic hash on the contents of the first region of the second memory and comparing the result of the first cryptographic hash to the first expected value, and
  verifying the contents of the first region of the first memory comprises performing a second cryptographic hash on the contents of the first region of the first memory and comparing the result of the second cryptographic hash to the second expected value.

15. The method of claim 10, further comprising:
  performing, using the first processor, a first checksum operation on the contents of the first region of the second memory and comparing the result of the first checksum operation with a first expected checksum result, and
  performing, using the second processor, a second checksum operation on the contents of the first region of the first memory and comparing the result of the second checksum operation with a second expected checksum result.

16. One or more non-transitory, machine-readable storage media comprising a plurality of instructions stored thereon that, in response to being executed, result in a computer system:
  generating, using a trusted platform module of the computing system, a first expected result and a second expected result for verification of a first memory and a second memory of the computing system;
  verifying, using a first processor of the computing system, contents of a first region of the second memory having stored therein a software image for the second processor as a function of the first expected result; and
  verifying, using the second processor of the computing system, contents of a first region of the first memory having stored therein a software image for the first processor as a function of the second expected result.

17. The one or more non-transitory, machine-readable storage media of claim 16, wherein the plurality of instructions further result in the computing system:
  storing the first expected result in a second region of the first memory; and
  storing the second expected result in a second region of the second memory,
  wherein verifying the contents of the first region of the second memory comprises retrieving, with the first processor, the first expected result from the second region of the first memory,
  wherein verifying the contents of the first region of the first memory comprises retrieving, with the second processor, the second expected result from the second region of the second memory.

18. The one or more non-transitory, machine-readable storage media of claim 17, wherein the plurality of instructions further result in the computing system:
  verifying, using the first processor, configuration parameters for the second processor stored in a third region of the second memory; and
  verifying, using the second processor, configuration parameters for the first processor stored in a third memory region of the first memory.

19. The one or more non-transitory, machine-readable storage media of claim 16, wherein the first processor has read and write access to the first memory and has read-only access to the second memory and the second processor having read and write access to the second memory and having read-only access to the first memory.

20. The one or more non-transitory, machine-readable storage media of claim 16, wherein:
  verifying the contents of the first region of the second memory comprises performing a first cryptographic hash on the contents of the first region of the second memory and comparing the result of the first cryptographic hash to the first expected value, and
  verifying the contents of the first region of the first memory comprises performing a second cryptographic hash on the contents of the first region of the first memory and comparing the result of the second cryptographic hash to the second expected value.

* * * * *